United States Patent
Maybee et al.

(10) Patent No.: US 8,595,702 B2
(45) Date of Patent: Nov. 26, 2013

(54) SIMULTANEOUSLY DISPLAYING MULTIPLE CALL STACKS IN AN INTERACTIVE DEBUGGER

(75) Inventors: Paul Maybee, Seattle, WA (US); Daniel Moth, Seattle, WA (US); Johan Marien, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 935 days.

(21) Appl. No.: 12/403,578

(22) Filed: Mar. 13, 2009

(65) Prior Publication Data

US 2010/0235815 A1 Sep. 16, 2010

(51) Int. Cl.
*G06F 9/44* (2006.01)

(52) U.S. Cl.
USPC ........... 717/125; 707/736; 707/798; 717/132; 717/133; 717/144; 717/156; 717/157

(58) Field of Classification Search
USPC .................. 717/125, 132–133, 144, 156–157
See application file for complete search history.

(56) References Cited

U.S. PATENT DOCUMENTS

| | | | | |
|---|---|---|---|---|
| 6,014,514 | A * | 1/2000 | Sistare | ........................ 717/125 |
| 6,353,923 | B1 | 3/2002 | Bogle et al. | |
| 6,938,245 | B1 | 8/2005 | Spertus et al. | |
| 7,039,691 | B1 | 5/2006 | Turnidge | |
| 7,389,497 | B1 | 6/2008 | Edmark et al. | |
| 2003/0067481 | A1 * | 4/2003 | Chedgey et al. | ............. 345/738 |
| 2008/0244531 | A1 * | 10/2008 | Schmelter et al. | ............ 717/128 |
| 2008/0263522 | A1 | 10/2008 | Fung et al. | |

OTHER PUBLICATIONS

Reiss, Steven P., and Manos Renieris. "Encoding program executions." Proceedings of the 23rd International Conference on Software Engineering. IEEE Computer Society, 2001.*
Kimelman, Doug, et al. "Reduction of visual complexity in dynamic graphs." Graph Drawing. Springer Berlin Heidelberg, 1995.*
O'Connor, Mark, "Parallel Debugging is Easy", Retrieved at <<http://www.allinea.corn/whitepapers/ParallelIsEasy.pdf>>, pp. 1-12.
Brezany, et al., "DeHiFo—An Advanced HPF Debugging System", Retrieved at <<http://ieeexplore.ieee.org/stamp/stamp.jsp?arnumber=00746677>>, IEEE XPLORE, Jan. 26, 2009, pp. 7.
Schulz, Karl W., "Profiling and Debugging Tools", Retrieved at <<http://cfc.fis.uc.pt/events/tacc2008/docs/Profile_Debugging.pdf>>, Jul. 17, 2008, pp. 1-28.

(Continued)

*Primary Examiner* — Chameli Das
*Assistant Examiner* — Joanne Macasiano
(74) *Attorney, Agent, or Firm* — Ogilvie Law Firm

(57) ABSTRACT

Visual representations of multiple call stacks in a parallel programming system include a stack segments graph constructed by coalescing data from multiple stacks. The graph has nodes that represent stack segments and has arcs between adjacent segments. Similar stack frames are represented by the same node. In a stack prefix view of the graph, arcs are directed from a node representing stack frames to a node representing subsequently executed stack frames. In a method-centered view, an arc is shown between a node representing stack frames of a selected method and a node representing adjacent stack frames. The graph can be based on call stacks of all tasks or all threads, or based on call stacks of tasks or threads flagged by a user. Stack frame, thread, and/or task details are also displayed.

20 Claims, 5 Drawing Sheets

(56) References Cited

OTHER PUBLICATIONS

Arnold, et al., "Stack Trace Analysis for Large Scale Debugging", Retrieved at <<ftp://ftp.cs.wisc.edu/paradyn/papers/Arnold06STAT.pdf, pp. 1-15.

Lipski, et al., "vlsage—A visualization and debugging framework for distributed system applications", Retrieved at <<http://graphics.tu-bs.de/publications/vlsage.pdf>>, pp. 7.

Moth, Daniel and Olson, Jason, "Debugging Parallel Applications with Visual Studio 2010", Retrieved at channel9.msdn.com/posts/VisualStudio/Debugging-Parallel-Applications-with-Visual-Studio-2010, pp. 1-2 of text (video available online).

Toub, Stephen et al., "Improved Support for Parallelism in the Next Version of Visual Studio", Retrieved at http://msdn.microsoft.com/en-us/magazine/cc817396(printer).aspx, pp. 1-15.

* cited by examiner

SIMULTANEOUSLY DISPLAYING MULTIPLE CALL STACKS IN AN INTERACTIVE DEBUGGER

BACKGROUND

Sometimes a computational problem can be divided into pieces in a way that allows a system to work on more than one piece at a time. For example, concurrent computer programs simultaneously carry out multiple computing tasks, using mechanisms such as multiple threads or multiple computational processes. Parallel computing may be viewed as an example of concurrent computing, and the distinction between them is not critical here.

Parallel programs, like many other programs, are generally developed using tools such as source code editors, version control systems, documentation generators, compilers, interpreters, virtual machines, performance profilers, and/or debuggers. A debugger, in particular, is a computer program used to test and debug other programs, which are referred to as debuggee programs or simply as "debuggees". A debugger generally provides a software developer with some control over debuggee execution, such as pausing execution to examine the debuggee's variables and other internal state information, stepping through debuggee code line-by-line, and setting a breakpoint to stop debuggee execution when a specified condition occurs within the debuggee. Some debuggers also allow a developer to modify the debuggee's internal state during debugging by setting variables, instead of merely observing the internal state.

SUMMARY

A debugger user often seeks to understand the current execution state of a program that is being debugged. In particular, the content of the debuggee's call stacks can be useful. Parallel programs include multiple call stacks, with information that could be presented to the user in a wide variety of ways. Even so, Microsoft debuggers have not provided tools for consolidating and viewing information from multiple call stacks; users have been required to switch focus from stack to stack in order to get information about multi-threaded program state.

Some embodiments described herein provide support for visually representing call stack data of multiple call stacks in a parallel programming system. A stack segments graph is constructed, based on call stack data of multiple call stacks. The stack segments graph has nodes which represent stack segments and arcs which represent adjacency of stack segments. Similar stack frames are represented by the same node, and dissimilar stack frames are represented by different nodes. Stack frames can be deemed similar when each of the stack frames represents execution of code in the same method body, for example, as opposed to different frames representing execution in different respective method bodies. In some embodiments, the stack segments graph is constructed at least in part by initializing a set of nodes to be empty, searching the set of nodes for a matching node which represents at least one stack frame similar to stack frames at a specified depth in a specified stack, and adding nodes appropriately.

Some embodiments provide users with a visual representation of the stack segments graph, displayed on a screen, for example, or in a printout. Some embodiments provide a stack prefix view, in which arcs are directed from a node representing certain stack frames to a node representing subsequently executed stack frames. Some embodiments provide a method-centered view, in which an arc is shown between a node representing stack frames of a selected method and a node representing adjacent stack frames. Some embodiments provide a coalesced stacks view. Some views can be displayed with the graph nodes for top-of-stack locations represented in the display above bottom-of-stack locations, or below bottom-of-stack locations, whichever the user specifies.

In some embodiments, users can command a debugger to display a stack segments graph based on call stacks from all tasks, based on call stacks from all threads, or based on call stacks of tasks or threads which have been flagged by a user. In some, the debugger displays details of a stack frame, details of a thread, and/or details of a task. In some embodiments, a debugger's graphical user interface displays an indication visually distinguishing (from the surrounding information) an active stack frame of a current thread, an active stack frame of a current task, an active stack frame of a non-current thread, and/or an active stack frame of a non-current task. In some embodiments, a debugger's graphical user interface displays an indication distinguishing a current thread, and/or an indication visually distinguishing a current task. In some embodiments, a user can select a non-current frame to become a newly current frame, and a debugger window is then updated based on the newly current frame. Some embodiments allow a user to zoom in on a particular area of the visual representation of the stack segments graph, to zoom out to a view displaying the entire graph, and/or to drag-pan across the graph.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
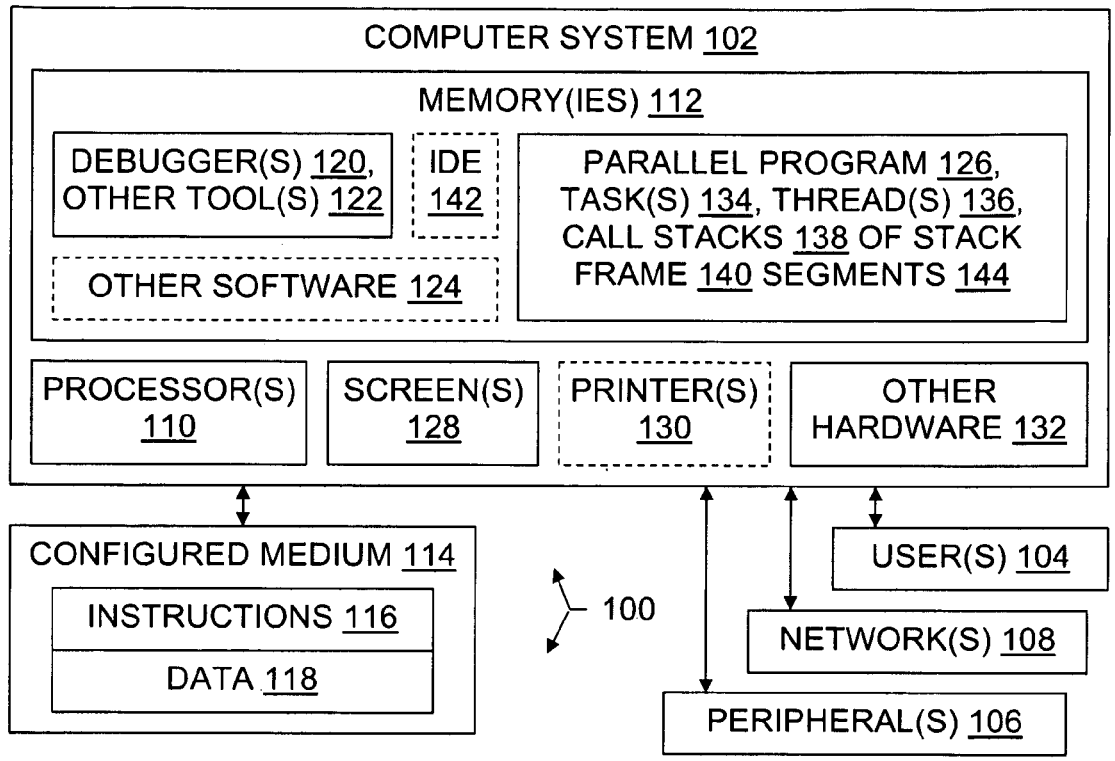
FIG. 1 is a block diagram illustrating a computer system having at least one processor, at least one memory, a parallel program, a debugger, and other items in an operating environment which may be present on multiple network nodes, and also illustrating configured storage medium embodiments.

A debugger user often needs to understand the current execution state of a program being debugged. In particular, understanding the content of the program's call stacks may be necessary to identify a bug. The user navigates through the program, examining details of the program state based on the user's understanding of the call stacks and other aspects of the program. Gaining adequate understanding of call stacks in programs which have multiple threads of execution can be difficult when the user is required to piece together a mental picture from a series of linear stack trace lists. Navigating the program state based on this mental model can be arduous and error prone when it involves a long series of steps.

Some embodiments described herein provide a convenient tool to view and navigate the program state via a graphical display of the content of multiple program stacks. Multiple stacks are consolidated in a manner that factors out common elements to reduce the visualization complexity, thereby making debugging easier. Program state comprehension and navigation are facilitated in an interactive debugging environment through the use of graphical presentations of program call stacks. Some embodiments can be used in the first tool coming out of Microsoft for debugging new parallel runtimes. Some can be used on a commercial scale to present stacks that correlate to the parallel execution of code covering all paths of execution and not just those of the current thread. Some include a bird's eye view which allows the representation of call stacks to scale well with any amount of data on the current monitor's display real estate.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, computational processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "computational process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

Throughout this document, use of the optional plural "(s)" means that one or more of the indicated feature is present. For example, "node(s)" means "one or more nodes" or equivalently "at least one node".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed as discussed herein, e.g., into call stack representations, stack segment graphs, user interface indications, graphical displays, and/or other items and operations.

Memories 112 may be of different physical types. A debugger 120 and other software development tools 122, other software 124, a parallel program 126 and other items shown in the Figures may reside partially or entirely within one or more memories 112, thereby configuring those memories. An operating environment may also include display screens 128 (a.k.a. monitors), printers 130, and other hardware 132, such buses, power supplies, and accelerators, for instance.

A parallel program 126 which is being debugged with a debugger 120 and/or developed with other tools 122 includes task(s) 134 and/or thread(s) 136. Parallelism may be implemented in a program 126 using multiple tasks 134, multiple threads 136, or both. In execution, the parallel program 126 includes multiple call stacks 138, which are built of stack frames 140.

A given operating environment 100 may include an Integrated Development Environment (IDE) 142 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use parallel programs.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
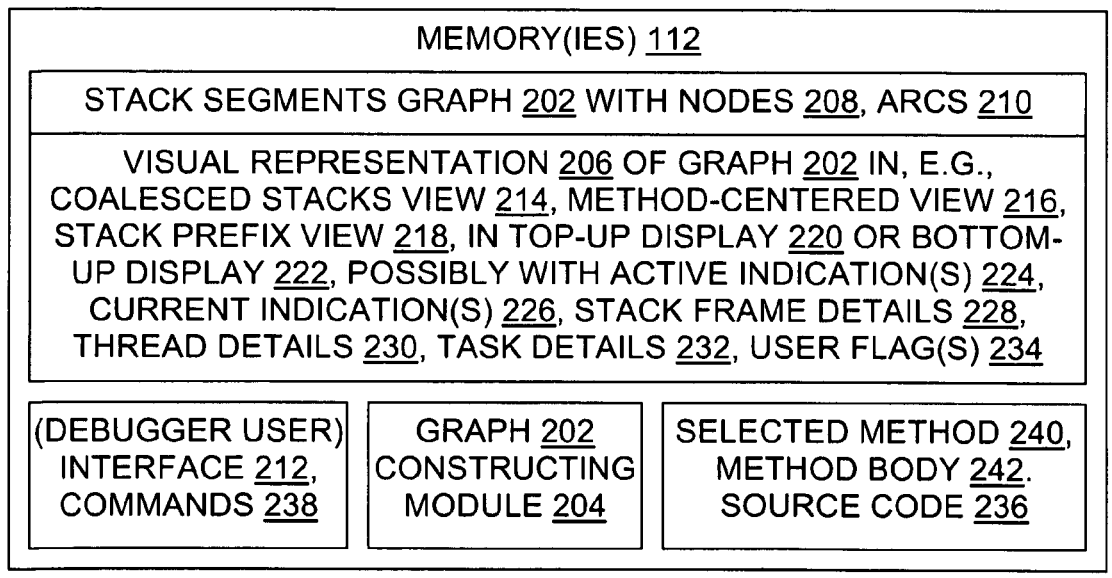
FIG. 2 is a block diagram illustrating several aspects of visual representations of call stacks of a parallel program in a debugger.

FIG. 2 illustrates an architecture which is suitable for use with some embodiments, and in particular, several aspects of visual representations of call stacks of a parallel program in a debugger. Some embodiments display a merged stack view for all the stacks in an arbitrary set of stacks, thereby offering a high level (or even global) view of computational process state by presenting a stack segments graph 202 which overlays call stack data for multiple stacks 138 concurrently.

It will be understood that the stack segments graph 202 may include a data structure component configuring a computer memory 112 in operable connection with processor(s) 110 and code in a module 204 which constructs, traverses, edits, and/or otherwise operates on the data structure. A module 204 may include libraries, utilities, stand-alone programs, plug-ins, classes, and/or objects, etc. The stack segments graph 202 also includes zero or more visual representations 206 which configure a display screen 128, a printer 130 printout, and/or other visually perceptible items. For convenience, the data structure and/or the visual representation(s) are referred to as the stack segments graph 202, and those of skill will understand from context whether the data structure, the visual representation(s), or both are referenced. In the event of a question, the broadest valid interpretation should be used. The same holds true of pieces within a stack segments graph 202, such as node(s) 208 and arc(s) 210 of a particular graph 202.

The visual representation(s) 206 may be presented, e.g., in a debugger or other tool's user interface 212. Not every embodiment requires a debugger 120. Visual representation(s) 206 may also be useful in other tools 122, e.g., to examine the behavior of a kernel scheduler tool 122, a compiler tool 122, a profiler tool 122, or any other tool which creates, assigns, modifies, or otherwise operates with multiple call stacks 138.

Some visual representations 206 provide a coalesced stacks view 214, in which similar frames 140 of stacks 138 are coalesced into a single node 208, or at least into fewer nodes 208 than the number of coalesced stacks 138. Some visual representations 206 provide a method-centered view 216, in which frames 140 of stacks 138 executing in the body 242 of a selected method 240 are coalesced into a single node 208. Other stack frames leading to the selected method's invocation may also be consolidated, to provide a coalesced stacks view 214 in the same display with the node representing the selected method 240. Some visual representations 206 provide a stack prefix view 218, which is a coalesced stacks view in which stacks with common prefixes are represented by the same prefix node 208. In some embodiments, any of the views 214, 216, 218 may be shown on screen in either a top-up display 220 (graph nodes 208 with top-of-stack locations represented on the display above nodes with bottom-of-stack locations) or a bottom-up display 222 (top-of-stack locations below bottom-of-stack locations).

In some embodiments, visual representations 206 include active indication(s) 224, such as an indication 224 distinguishing an active stack frame of a current thread, an indication 224 distinguishing an active stack frame of a current task, an indication 224 distinguishing an active stack frame of a non-current thread, and/or an indication 224 distinguishing an active stack frame of a non-current task. In some embodiments, visual representations 206 include current indication(s) 226, such as an indication 226 distinguishing a current thread and/or an indication 226 distinguishing a current task. In some embodiments, visual representations 206 include details such as details 228 of a stack frame 140, details 230 of a thread 136, and/or details 232 of a task 134. In some embodiments, visual representations 206 include user flag(s) 234 marking one or more tasks and/or one or more threads for inclusion in the visual presentation, that is, the call stacks 138 of flagged item(s) should be included in the set of call stack(s) which are represented visually by the stack segments graph 202. Flags excluding tasks and/or threads from a stack segments graph are more convenient in some situations, but are otherwise equivalent to flags 234 including items. A visual representation 206 may also include user-defined task names, thread names, method names, variable names, and/or other excerpts from source code 236 of a parallel program 126.

In some embodiments, commands 238 may be entered by a user to navigate through the displayed visual representation 206. For example, some embodiments recognize a command 238 to zoom in on a particular area of the visual representation of the graph, a command 238 to zoom out, and a command to drag-pan across the graph. Some embodiments recognize commands to switch between a top-up display 220 and a bottom-up display 222. Some embodiments recognize commands to display indications 224, 226 and details 228, 230, 232; commands to set user flags 234; and/or commands to change the current frame 140. Commands 238 to save debugger state, to step, to set break points, and perform other debugger 120 or tool 122 operations are also recognized in some embodiments.

In some embodiments, two basic presentation views are supported, namely, the stack prefix view 218 and the method-centered view 216. The stack prefix view is dominated by a prefix version of a stack segments graph 202, which is composed of a set of nodes 208 connected by directed arcs 210. The nodes 208 represent stacks 138 segments (a segment 144 is one or more contiguous frames 140). Arcs 210 join a node for a prefix segment 144 to nodes of the prefix segment's successor segment(s) 144. Stacks with common prefixes are represented by the same prefix node. Thus, each node 208 in this view represents a series of similar stack frames on a set of stacks. The outgoing arcs of a prefix node point to the nodes representing the stack frames immediately after those represented by the prefix node.

In some embodiments, the graph 202 is constructed from a set of call stacks 138 according to the following process, which is referred to hereafter as "set-based graph construction":

```
For each stack S {
    Depth = 0;
    C = RootNodes.findbyMatchingFirstNodeMethod(S[0]);
    // search the set of root nodes for a match
    If ( C == null ) {
        C = RootNodes.AddNode(new node(S, 0));
        // no match, add a new node containing this stack
    }
    Else {
        Foreach frame F of S { // examine each frame of S
            If ( C[Depth].Method == F.Method ) {
                // current node continues to match current frame
                C.Stacks.Union(S);
                    // add this stack to this node's set of stacks
            }
            Else {
                if (C[Depth] == null) {
                    // current frame is past end of current node
                    Foreach node D in Arcs.Out(C) {
                        // search all out arcs from C
                        If (D[Depth].Method == F.Method)
                        {
                            // found a successor node that matches
                            // the current frame
                            C = D;
                                // make it the new current node
                            C.Stack.Union(S);
                                // add S to this stack set
                                // of the node
                            Break;
                        }
                    }
                    If ( D == null ) {
                        D = new node(S, Depth);
                        // no matching node, so new node contains
                        // the remaining frames of S
                        Break;
                    }
                }
                Else {
                    D = C.SplitOff(Depth);
                    // split previous node in two parts at depth
                    D.Stacks.Remove(S);
                    // S is not a member of the
                    // split off successor node
                    Arcs.Add(C,D);
                    D = new node(S, Depth);
                    // add new successor node containing
                    // S's remaining frames
                    Arcs.Add(C,D);
                }
                Break;
            }
            Depth++;
        }
    }
}
```

In some embodiments, the method-centered view 216 is an alternative graphical representation 206 of the stack data. In the method-centered view a selected method 240 is placed in a node 208 by itself in the center of the graph 202. Each stacks 138 that contains a call to that method is represented. For each unique stack prefix a prefix node 208 is added, as well as an arc 210 from that prefix node to the method node. The remaining nodes of the graph 202 are constructed according to the process above for a prefix graph rooted at the method node, and displayed below the method node.

In some embodiments, the stack prefix view 218 is a representation 206 of a collection of call stacks 138 as a set of nodes 208 and directed arcs 210 between the nodes. The resulting graph 202 is a forest of call trees that represent the combined state of all the stacks. Each node N corresponds to a segment of stack frames 140 that appears at the same depth and in the same order in one or more of the call stacks. An arc from a node N1 to a node N2 indicates that a (proper) subset of N1's stacks continue on to execute the segment represented by N2. For example, consider the following three stacks:
Stack1: A, B, C, D, H, F
Stack2: A, B, C, G, H, I
Stack3: A, B, C, G, H, J In this example, the letters A through J represent individual stack frames 140. A stack prefix graph for these three stacks looks like the diagram displayed in FIG. 3. Frames A, B, and C form a segment 144, frames G and H form another segment, and so on. In a particular embodiment, of course, other information may also be displayed, such as indication(s) 224, 226 and/or detail(s) 228, 230, 232.

In some embodiments, the method-centered view 216 is a representation 206 of a collection of call stacks that is centered on a selected method 240 M that appears as a frame (or frames) in one or more of the stacks. If S is the set of stacks that contain M, then the graph contains three sets of nodes 208:

Set 1: One node 208 for each unique stack segment 144 that leads to an invocation of (the first appearance of) method M in stacks set S.

Set 2: One node 208 representing method M.

Set 3: Node(s) 208 of a stack prefix graph 202 generated from stacks set S by truncating the appropriate segment of set 1 and M from each stack.

One arc 210 is added from each node of Set 1 to the node for method M (Set 2). One arc is added from M to each node in the stack prefix forest, Set 3. Recursive calls may be shown by an arc looping from the Set 2 node back to itself.

Figure 3:
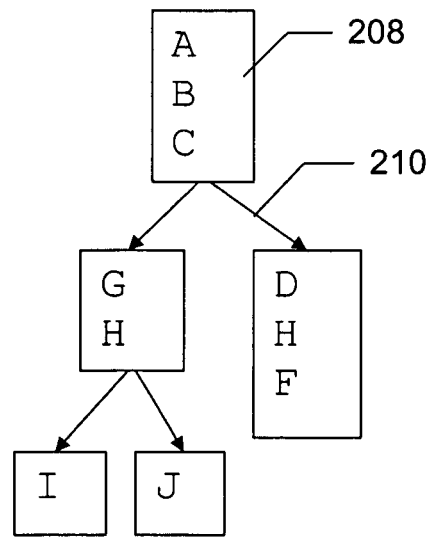
FIG. 3 is a diagram illustrating a coalesced stacks view in a visual representation of call stacks of a parallel program in a debugger.
Figure 4:
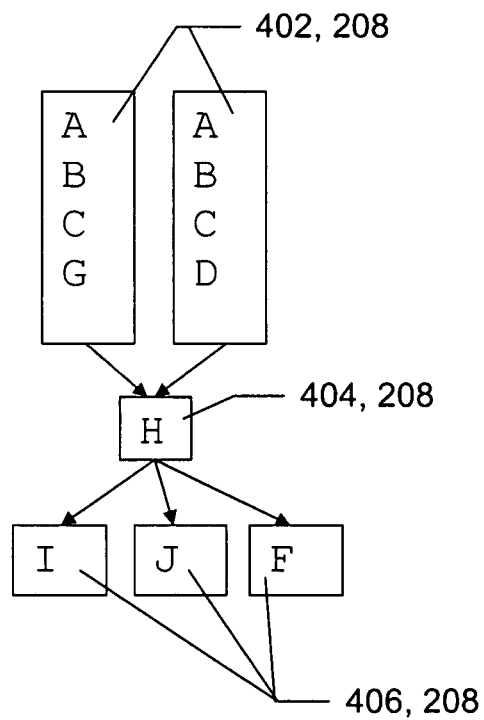
FIG. 4 is a diagram illustrating a method-centered view in a visual representation of call stacks of a parallel program in a debugger.

For example, using the stack data above that underlies the FIG. 3 example, and selecting method H as the selected method 240, an embodiment provides a method-centered view with a graph like the one shown in FIG. 4. The nodes for Set 1 are designated 402 in FIG. 4, the Set 2 node representing selected method H is designated 404, and the nodes of the stack prefix portion of the graph (Set 3) are designated 406.

In some embodiments, a representation 206 shows nodes for call stacks from all tasks 134 of a program 126 in one single view, or shows call stacks from all program threads 136 in one single view. In some, a user can set flags 234, such as explicit individual selections of tasks/threads and/or expressions whose values are used to filter in/out tasks/threads from a selection, and thereby show in a single view call stacks from particular threads/tasks of interest.

In some embodiments, details (e.g., parameter bindings) of each stack frame are shown in a tooltip when hovering over each method context. The details of each stack frame presentation are configurable via context menu commands 238. Details of a thread/task (e.g. IDs, status) are shown in a tooltip when hovering over the header of the call stack segment.

In some embodiments, frame(s) with special context are highlighted explicitly. For instance, the active stack frame—that is the frame at top of stack—of the current thread/task is indicated via an icon indication 224 (e.g., a yellow arrow) in front of the method context and on the tooltip. The active stack frames of non-current threads/tasks are indicated via an icon indication 224 (a cloth threads icon) in front of the method context and on the tooltip. The current stack frame—this is the frame currently being focused on—of the current thread is indicated via an icon indication 226 (e.g., a green arrow) in front of the method context and on the tooltip. The current thread/task is indicated on the view via one or more of the following indications 226: a blue highlight (for instance) on the relevant call stack segments and blue arrows (for instance) connecting the call stack segments; bolding the specific stack frame in the tooltip on the method context; a checkbox on the menu of the method context that allows switching between stack frames. It will be understood that other colors, shapes, icon locations, and user interface 212 mechanisms are used as indications 224, 226 in other embodiments.

In some embodiments, the user may navigate the details of the debugger state by a command 238 selecting any displayed frame as the new current frame. Switching frames is commanded 238 through a context menu or by double-clicking on method contexts. The entire view can be drawn top-down or bottom-up, that is, with top-of-stack at top or bottom of the view. In some embodiments, the current stack frame stays in view (autoscrolls) as the user changes focus or steps through program 126 code. In some, the view representation 206 can be zoomed so that large graphs 202 are visible or to focus-in on particular areas of the graph. In some embodiments, a bird's eye view supports quick navigation of large graphs 202; in some, drag panning is supported for easy movement without resorting to scrollbars.

Figure 5:
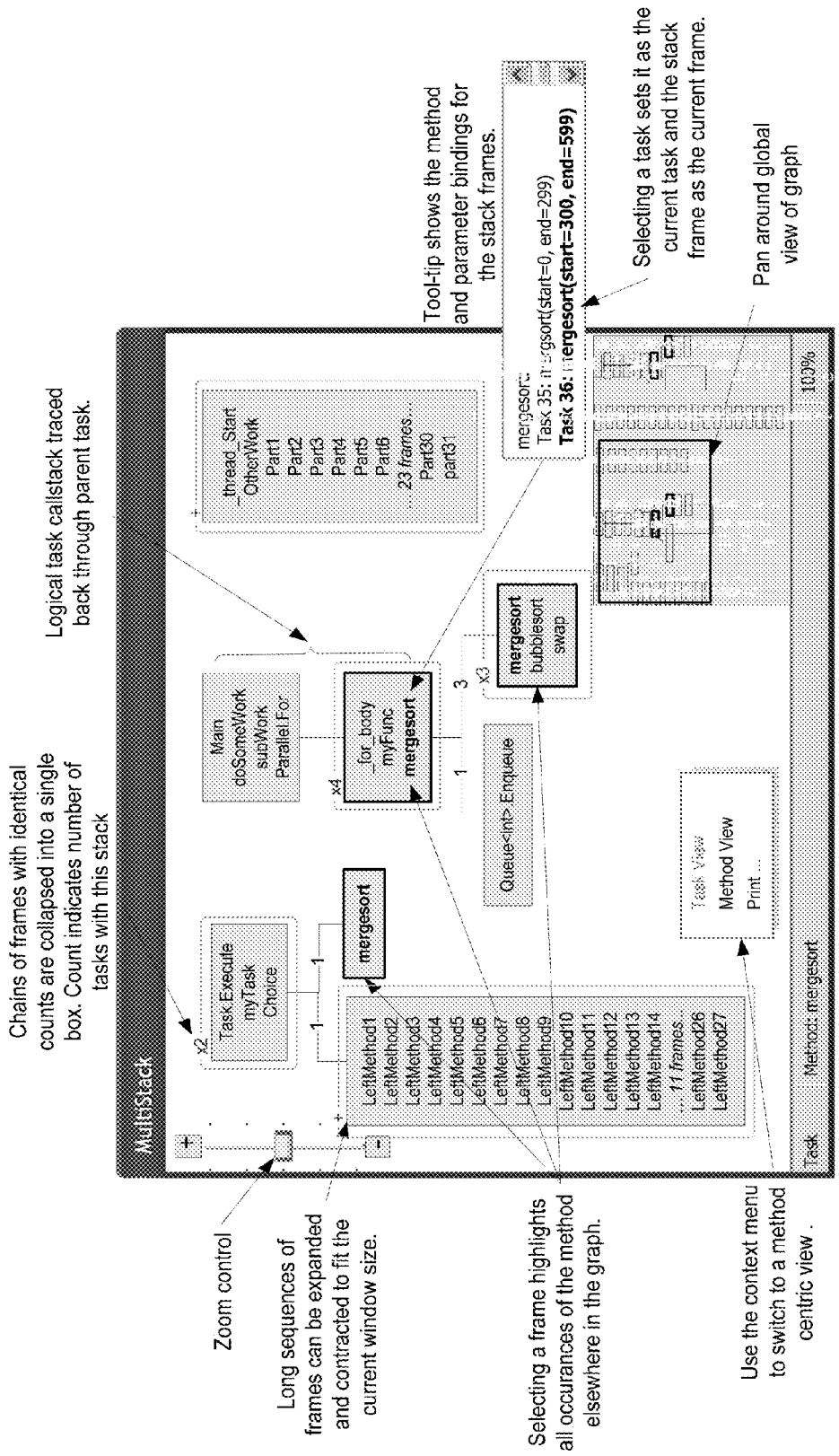
FIG. 5 is an annotated screen shot illustrating several aspects of visual representations of call stacks of a parallel program in a debugger.
Figure 6:
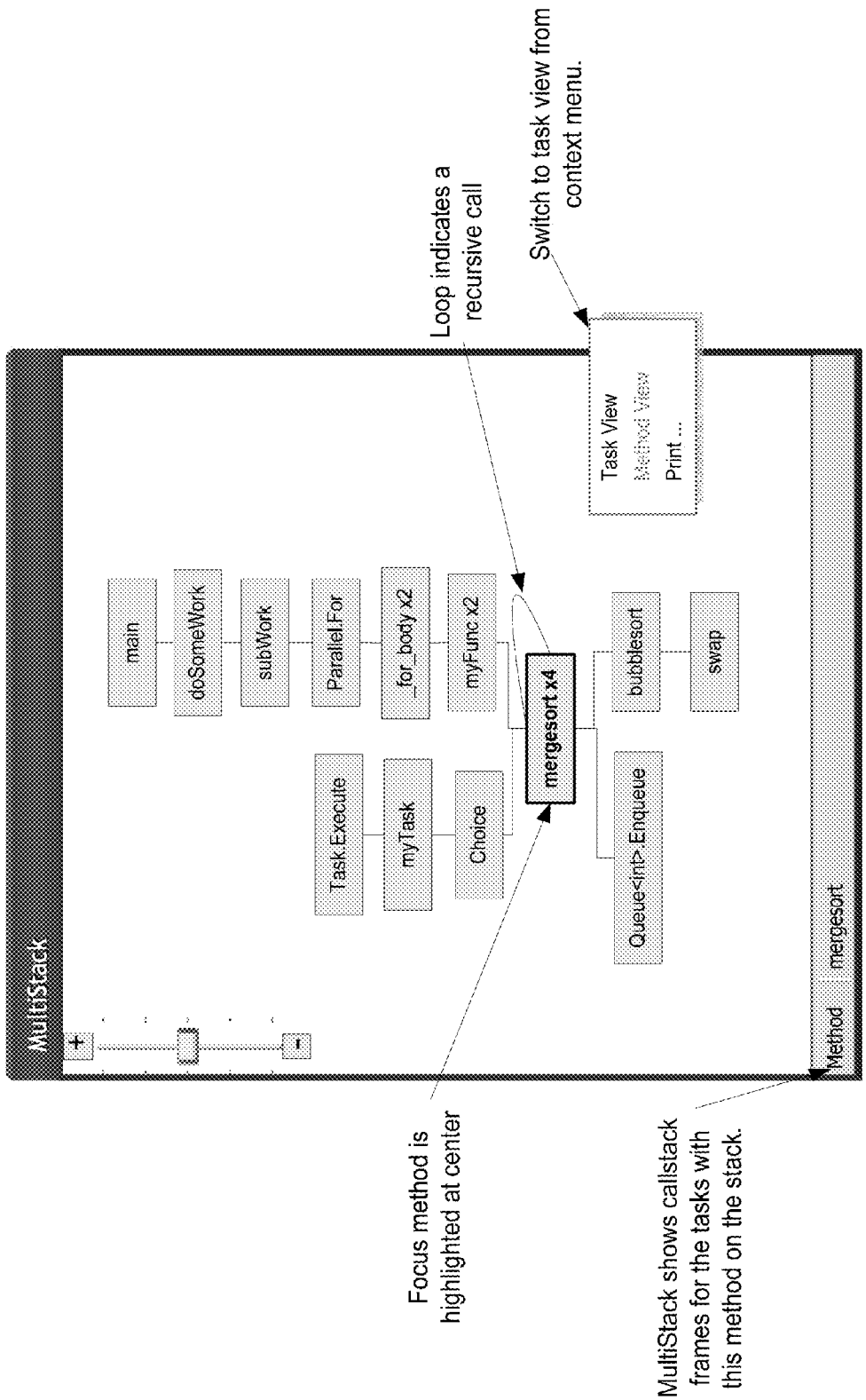
FIG. 6 is an annotated screen shot illustrating a method-centered view in a visual representation of call stacks of a parallel program in a debugger.

FIGS. 5 and 6 show screen shots with annotations pertaining to some of the foregoing features. FIG. 5 shows a zoom control, context menu, tooltip, panning tool, bolding, and other features. FIG. 6 shows a method-centered view, with a context menu, a looping arc 210 to show recursion, and other features.

With reference to FIGS. 1 through 6, some embodiments provide a computer system 102 with a logical processor 110 and a memory 112 configured by a debugger 120 and/or other tool(s) 122 in operable communication with the logical processor. A stack segments graph 202 data structure (at least; a representation 206 may also be present) configures memory in operable communication with the tool(s). The stack segments graph is based on call stack data of multiple call stacks 138. As discussed, the stack segments graph 202 has nodes 208 which represent stack segments 144 and arcs 210 which represent adjacency of stack segments. The arcs may be directed arcs. Similar stack frames are represented by the same node, and dissimilar stack frames are represented by different nodes.

In some embodiments, a display screen 128 is in operable communication with the tool and is configured by a coalesced stacks view 214 that is based at least in part on the stack segments graph data structure. In some embodiments, a screen 128 is configured by a stack prefix view 218 based on the stack segments graph data structure. In some, a screen 128 is configured by a method-centered view 216 based on the stack segments graph data structure.

In some embodiments, a screen 128 is configured by details 228 of a stack frame, details 230 of a thread, and/or details 232 of a task. In some embodiments, a screen 128 is configured by active indication(s) 224 and/or by current indication(s) 226 for threads and/or tasks.

In some embodiments peripherals 106 such as human user I/O devices (screen, keyboard, mouse, tablet, microphone, speaker, motion sensor, etc.) will be present in operable communication with one or more processors 110 and memory 112. However, an embodiment may also be deeply embedded in a system, such that no human user 104 interacts directly with the embodiment. Software computational processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 7:
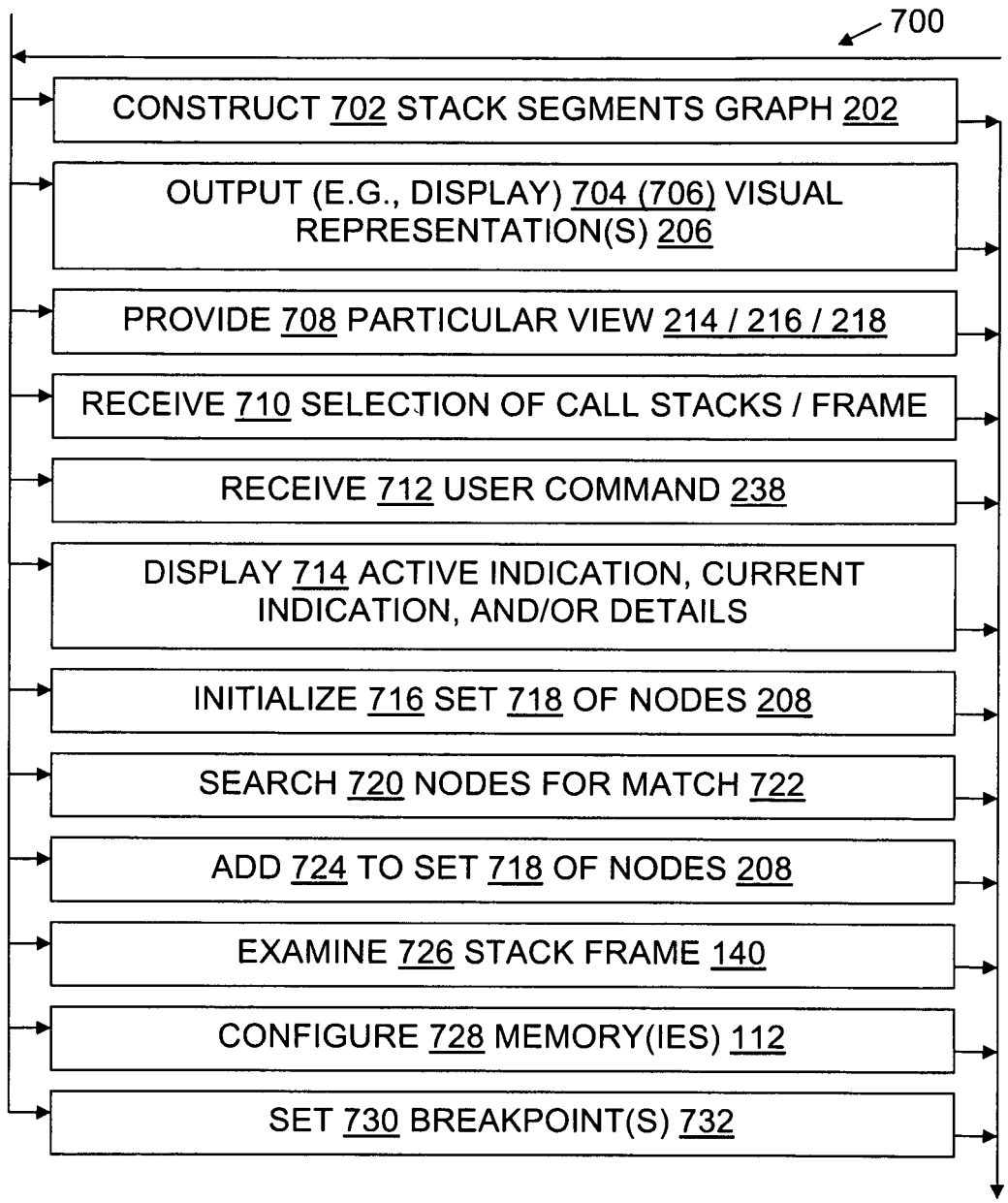
FIG. 7 is a flow chart illustrating steps of some process and configured storage medium embodiments.

FIG. 7 illustrates some process embodiments in a flowchart 700. Processes shown in the Figures may be performed in some embodiments automatically, e.g., by a debugger 120 or other tool 122 under control of a script requiring little or no user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 7. Steps may be performed serially, in a partially overlapping manner, or fully in parallel. The order in which flowchart 700 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a graph constructing step 702, an embodiment constructs at least the data structure portion of a stack segments graph 202. Step 702 may be accomplished using any process described herein for constructing a graph 202 (e.g., method-centered view construction, set-based graph construction) for any one or more of the views of interest, namely, a coalesced stacks view 214, a method-centered view 216, a stack prefix view 218, or a stack postfix view. A stack postfix view is similar to a stack prefix view, but has arc(s) directed from nodes representing segments to nodes representing previously executed segments.

During a representation outputting step 704, an embodiment outputs a visual representation 206 of a stack segments graph 202. Displaying 706 on a screen 128 is an example of outputting step 704; some other examples include outputting a representation 206 to a printer 130, to a disk file, and/or to a network 108. In some embodiments, outputting step 704 is interleaved with graph constructing step 702, such that a representation 206 of a graph 202 is outputted as the graph is being constructed. In other embodiments, the graph 202 data structure is fully constructed first, and then the graph representation 206 is outputted 704.

During a view providing step 708, a particular view is provided in a visual representation 206 of a stack segments graph 202. Step 708 may be accomplished as part of an outputting step 704 (e.g., as part of a displaying step 706). In addition to providing 708 a view 214, 216, and/or 218, an outputting step 704 may include outputting active indication(s) 224, current indication(s) 226, and/or details 228, 230, 232.

During a selection receiving step 710, an embodiment receives a selection of call stacks 138 and/or stack frames 140 to use in constructing 702 a graph 202. Selection receiving step 710 may be accomplished by defaulting to selection of the call stacks of all tasks/threads, or an embodiment may receive 710 a selection in the form of user flag(s) 234. Familiar interface mechanisms (peripherals 106, cursors, menus, and so on) may be used to give the user feedback during selection receiving step 710.

During a command receiving step 712, an embodiment receives command(s) 238 through an interface, such as a debugger user interface 212, for example. Commands 238 may be navigational (pan, zoom, scroll, etc.), selectional (set current frame, set active task(s), etc.), ministerial (open file, save to file, etc.), or investigational (set 730 breakpoint 732, step over, etc.), for example.

During an indication-details displaying step 714, an embodiment displays on a screen 128 active indication(s) 224, current indication(s) 226, and/or details such as details 228, 230, 232. Step 714 may be part of a visual representation displaying step 706.

During a set initializing step 716, an embodiment initializes as empty a set 718 of nodes 208. Step 716 is performed as part of a constructing step 702 which constructs a graph 202 using set-based graph construction. Sets 718 may be implemented using bitsets, bags, linked structures, hash tables, and/or other data structures.

During a node searching step 720, an embodiment searches for a node match 722, as part of a constructing step 702 which constructs a graph 202 using set-based graph construction.

During a node adding step 724, an embodiment adds a node to a set 718 of nodes, as part of a constructing step 702 which constructs a graph 202 using set-based graph construction.

During a frame examining step 726, an embodiment examines a stack frame 140, as part of a constructing step 702 which constructs a graph 202 using set-based graph construction.

During a memory configuring step 728, a memory 112 is configured by a stack segments graph 202 data structure, by a visual representation 206 of a stack segments graph 202, by code of a stack segments graph 202 constructing module 204, and/or otherwise in connection with the investigation of multiple call stacks 138 as discussed herein.

The foregoing steps and their interrelationships are discussed in greater detail below, in connection with various embodiments.

Some embodiments provide a process for visually representing call stack data of multiple call stacks 138 in a parallel programming system 102. The process includes constructing 702 a stack segments graph 202 based on call stack data of multiple call stacks. The stack segments graph 202 has nodes 208 which represent stack segments 144, and arcs 210 which represent adjacency of stack segments. Similar stack frames are represented by the same node and dissimilar stack frames are represented by different nodes. The process in these embodiments also displays 706 on a screen 128 a visual representation 206 of the stack segments graph. The display may show a coalesced stacks view, such as a stack prefix view, and/or a method-centered view. A "segment" or "stack segment" is one or more stack frames on a particular stack. A "coalesced segment" is two or more similar stack segments from two or more stacks. "Adjacency" in an arc does not necessarily require direction, but does not exclude directed arcs either. A "visual representation" on a screen can include boxes, text, lines, and other graphic elements, colored or not, to visually display the graph and its associated information.

In some embodiments, stack frames are deemed similar when each of the stack frames represents execution of code in the same method body, as opposed to different frames representing execution in different respective method bodies. In some embodiments, stack frames are not coalesced despite sharing the same method body as their execution context, if there is a split further up the call stack; once split, common call stack segments are not rejoined.

In some embodiments, a process provides 708 a stack prefix view, namely, a view having at least one arc directed from a node representing certain stack frame(s) to at least one node representing subsequently executed stack frame(s). Some embodiments provide a similar stack postfix view, namely, a view having at least one arc directed from a node representing certain stack frame(s) to at least one node representing previously executed stack frame(s).

In some embodiments, the graph is constructed 702 at least in part with the following steps, which are an example of set-based graph construction:

```
initializing 716 a set of nodes to be empty;
for each stack S in a set 718 of stacks, doing the
    following:
    searching 720 the set of nodes for a match 722,
        namely, a node which represents at least one
        stack frame similar to stack frame(s) at a
        specified depth in stack S;
    if no match is found, then adding 724 to the set
        of nodes a new node C representing the
        current stack S;
    otherwise examining 726 each frame F of the
        current stack S and doing at least one of the
        following:
        adding 724 S to a set of stacks represented
            by node C if F is similar to a frame
            represented by node C,
        adding 724 S to a set of stacks represented
            by a successor node of node C if F is
            similar to a frame represented by that
            successor node, or
        adding 724 S to a set of stacks represented
            by a newly created node.
```

In some embodiments, the graph 202 constructed 702 includes a stack prefix view graph, and in some the graph includes a method-centered view graph. A method-centered view graph has at least one arc between a node representing stack frame(s) of a selected method and at least one node representing adjacent stack frame(s). In some cases, there are no predecessor segments before the selected method; in some, there are no successor segments after the selected method. In some cases, there exist both predecessor and successor segments in the graph. In some cases, the graph is constructed 702 at least in part by including in the graph a node N for each unique stack segment that leads to an invocation of the selected method as well as an arc directed from that node N to the node representing stack frame(s) of the selected method, and there are at least predecessor segments in the graph.

In some embodiments, the process obtains call stack data based on at least one of the following: a command 238 to show call stacks from all tasks 134, a command 238 to show call stacks from all threads 136, a command 238 to show call stacks of tasks or threads which have been flagged 234 by a user. Some embodiments receive 712 through a user GUI a selection of a non-current frame to become a newly current frame, and then update the display configuring a debugger window, based on the new current frame.

Some embodiments display and/or otherwise output 704 details 228, 230, 232 in response to user GUI input. Some display and/or otherwise output 704 active indication(s) 224 and/or current indication(s) 226, e.g., in a user GUI. Some embodiments receive 712 through a user GUI a command 238 to display the graph nodes with top-of-stack locations represented on the display above bottom-of-stack locations, or a command 238 to display the graph nodes with top-of-stack locations represented on the display below bottom-of-stack locations. Some embodiments receive 712 through a user GUI a command 238 to zoom in on a particular area of the visual representation of the graph nodes, a command 238 to zoom out to a view displaying the entire visual representation of the graph nodes, and/or a command 238 to drag-pan across the visual representation of the graph nodes.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as stack segments graphs 202, visual representations 206, and modules 204 in the form of data 118 and instructions 116, read from a removable medium 114 and/or another source such as a network connection, to form a configured medium. The configured memory 112 is capable of causing a computer system to perform process steps for transforming call stacks data through graph construction and visualization as disclosed herein. FIGS. 1 through 7 thus help illustrate configured storage media embodiments and process embodiments, as well as system embodiments. In particular, any of the process steps illustrated in FIG. 7, discussed in the pseudo-code for set-based graph construction, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

In some embodiments, a debugger 120 and other tools 122 are additions to the Microsoft Visual Studio® environment, are intended to meet specific needs of developers debugging parallel programs, and are logically part of a VSDebug package. Some aspects of a model implemented at the level of the debugger package include the concept of the current thread and current stack frame which serve to synchronize the behavior of various debugger tools. Added to this list are the current task, and current task set.

In some embodiments, setting the current task to a new value has the side effect of also setting the current thread and the current stack frame to reflect the selected context, that is, the current thread is set to the thread executing the context and the current stack frame is set to the contexts top stack frame. The debugger package maintains these values and raises events when they are changed. Tools may subscribe to the events and react to the changes. A pause in execution may be caused by an exception, execution of a step, or hitting a breakpoint. For any of these reasons the debugger will identify a current thread—usually the thread executing the code that caused the pause. If there is a task that can be identified as executing on that thread then it becomes the current task. Otherwise the current task is cleared.

The purpose of the current task set is to restrict tool focus to a subset of the application program 126 state. Debugger tools that display data for multiple tasks use this feature to identify an appropriate range of tasks. There is no requirement that the current task set contain the current task. A Task Tool displays a task creation hierarchy on the left and a selected task's children on the right. Selecting a task makes it and its children the current task group. The current task is highlighted if it is visible in the group content window. A task that is visible may be selected, making it the new current task. Unlike the current task which may change via program execution or activity in other tools windows, Task Tool selection is the only mechanism for setting the current task group. In some embodiments, information viewable via interaction with the Task Tool window includes, for example, details 232 such as task ID, task status, task location, task call stack, task name, task parent, and task thread assignment.

A Consolidated Stack Tool displays 706 a merged stack view for all the tasks in the current task set. It is intended to offer a high level (or global) view of computational process state by presenting a graph 202 which overlays call stack data for multiple stacks concurrently. The presentation requires that many call stacks be traversed and the data rendered. There are two implications of this observation, first, that the tool will typically require a lot of screen space, and second, that it may slow down debugger step performance (although performance optimizations might mitigate a slow down). For these reasons the Consolidated Stack Tool is envisioned in some embodiments as a state exploration tool rather than a core debugger view. Each node in the graph corresponds to a set of similar stack frames, that is, frames with the Program Counter in the same method, executed by some number of different tasks. Selecting from the set of frames will select the frame as the current stack frame. FIG. 5 shows a sample screen shot of a "cactus" stack task view of a Consolidated Stack Tool. FIG. 6 shows a sample screen shot of a "cactus" stack method view of a Consolidated Stack Tool.

In some embodiments, the following information is viewable via interaction with a Consolidated Stack Tool window:
  Call stacks for all running tasks
  Call stacks for all running tasks in the current task set
  Indication of the stack for the current task
  Indication of the current stack frame
  Details for each stack frame:
    Parameter binding information
    Method name
    Module name
    Line number information
  Indication of all occurrences of a selected method
  For a selected method view all callers and callees
  Zoom in and out to see the details of large graphs
Operations on the data displayed include:
  Selection of a stack frame as the current stack frame
  Selection of a task from a shared stack or stack frame as the current task
  Selection of the current task set:
    By method
    By shared call stack
    By shared stack frame position in a call stack With regard to a data model, in some embodiments, each executing task has an associated logical thread with a call stack. The Consolidated Stack Tool displays views of these call stacks. For each executing task the tool uses the following information from a TaskTable:
  The task id
  The call stack, in order from top of stack.
  For each stack frame:
    Parameter binding information
    Method name
    Module name
    Line number information In some embodiments, a Multi Stack window provides a productivity boost to customer developers already using an existing Call Stack window of a debugger 120. The Multi Stack window allows visualization of call stacks of multiple threads 136 or tasks 134 in a single view. At a high level view, features in some embodiments include: a single view of all call stacks 138 of all threads; pruning down the list of threads by showing call stacks for flagged 234 threads only; displaying 706 call stacks for tasks, e.g., a thread can have multiple tasks on its call stack but the tool shows only the task-relevant threads; pruning down the list of tasks by showing call stacks for flagged 234 tasks only; navigating to source code 236, as the user can do from the Call Stack window; displaying 706 information in a consistent manner with the rest of the IDE 142, e.g., current thread, active stack frame of current thread, active stack frame of other threads, current stack frame, breakpoints 732; method-centered view 216 focus by pivoting on selected method in the stack.

In some embodiments, usability goals are the same as basic usability goals for many user interfaces (UIs). Examples include ease of discovery (discoverable UI items include those that the user would click on and items that change their appearance when the user hovers the mouse over them, discoverable UI items include those that the user is already familiar with because they present themselves in the same way as something else that the user is familiar with), and ease of use (a measure is the number of clicks it takes a user to achieve their goals, modal windows are generally discouraged, popup windows are candidates for replacement by "flyout" windows triggered by single clicking or hovering over a UI target). In some embodiments, the Multi Stack window is generally as consistent as possible with the existing Call Stack window.

In some embodiments, the Multi Stack window can show stack frames of threads or stack frames of tasks, but never shows both at the same time; the user can pick a viewmode through the user interface 212. The entire window is occupied by a TabControl which has two Tabs: Threads and Tasks. The user clicks on a tab to select the viewmode, and that selection is remembered for that user. In Microsoft .NET projects prior to v4 there is no TabControl since the Tasks tab is not applicable. Choosing the Threads tab shows stack frames from both native and managed Threads. The term "Thread/Task" refers to either Threads or Tasks viewmode. In some embodiments, for a specific breakpoint (or exception thrown, etc.), if the user switches between Threads and Tasks viewmode they observe that the total number of stack frames of Threads viewmode is larger than the number of frames for the Tasks viewmode. This is not a requirement or bug, merely an observation. If other task models are added, e.g., additional providers become applicable such as OpenMP, then the user interface will add more Tabs to support them.

In some embodiments, the window can either show the stack frames of all Threads/Tasks or only of a specific subset. The user is in control of that choice. The default is to show stack frames from all Threads/Tasks. The specific subset of Threads/Tasks is governed by which Threads/Tasks are flagged 234 in the respective buddy windows (Threads or Tasks).

In some embodiments, the existing Call Stack window shows the call stack of a single Thread in a ListView, where each ListViewItem is a stack frame, using three columns: an unnamed column for icons, a Name column, and a Language column. If the Multi Stack window is shown also for a single Thread/Task, the user's experience is very similar to the existing Call Stack window, in that they see a "box" on a diagram and the box is actually a ListView excerpt, in which there is no Language column and no column headers. Stack frames that are not part of user code are shown as greyed out. Also note that there are configuration options have all been disabled.

This is the view presented for Multi Stack by default. If a user turns on further options via the context menu in the Call Stack window, the user sees additional details per stack frame. For the Multi Stack window, options and details are shown in tooltips that appear for each stack frame. If the user enables a Just My Code feature, the Call Stack window collapses the non-user code into one frame. The same occurs in the Multi Stack window, but without the namespace name.

The foregoing describes the behaviour in some embodiments in a single Thread/Task scenario. When more than one Thread/Task is involved, the Multi Stack window builds on the appearance described for the single Thread/Task scenario. With multiple Threads/Tasks, the Multi Stack window additionally groups the common series of call stack frames into their own box/listview, called here a Call Stack Segment, and corresponding generally to a node 208 representing a segment 144. Call Stack Segments are connected with lines (arcs 210) so the user can mentally piece together the entire call stack for a given Thread/Task by mentally aggregating the stack frames of each Call Stack Segment. Each line has an arrowhead on one side to denote the direction of the call flow, e.g., from callee frames to called frames.

In some embodiments, Call Stack Segments that apply to more than one Thread/Task indicate the number of Threads/Tasks at the top of the Call Stack Segment box with a label, e.g. "4 Threads" or "4 Tasks" to signify that 4 Threads/Tasks share this series of stack frames. This formatting replaces a previous design of "x4". Additionally, a tooltip when hovering over the label displays details such as the Task info (Id: Task columns of Tasks window) for each Task.

With respect to keyboard navigational commands 238, in some embodiments, when the user tabs through the Multi Stack window using the TAB key, navigation occurs in a breadth first manner. In other words, the focus shifts from one call stack segment box to the one beside it, not to the one below it. Using the keyboard navigational UP/DOWN arrow keys traverses the ListView box up and down. When the selection reaches the first/last item in the ListView, the selection continues to the next ListViewItem of the next ListView box in the direction of the call graph/stack.

In some embodiments, the Multi Stack window highlights to the user the Current Thread/Task by highlighting the Call Stack Segments of the current Thread/Task; these highlightings are examples of current indications 226. Note that the Threads view always has a current Thread highlighted, but the Tasks view might not, e.g., if the current Thread of the application is not assigned to a Task. As the user chooses different stack frames to focus on, if the choice results in the current Thread/Task changing, the highlight changes as well. In some embodiments, highlighting is shown by making the borders of each call stack segment and the connecting lines thicker and green. Additionally, in some embodiments highlighting of the current Thread/Task is a lasso band drawing around the relevant boxes.

In some embodiments, the Call Stack shows stack frames bottom up—this is conformant with typical call stack tools. There is an alternative view known as the call graph view which would typically show stack frames top down. These approaches are examples of the top-up display 220 and the bottom-up display 222. The Multi Stack window supports both modes via a configuration in Visual Studio® options (Tools−>Options). When in BottomUp mode, the graph looks like a cactus; when in top down, it looks like a pyramid. The default is the bottom up view. The direction of the arrows between the call stack segment ListView boxes confirms the visual change.

In some embodiments, with regard to presentation of individual Stack Frames, a Stack Frame ListViewItem can be in one of two states: selected or current. Selection feedback is an example of an active indication 224.

As for selecting a Stack Frame (a.k.a. single left click), in some embodiments single left clicking on a stack frame selects it, as when Microsoft Windows™ Explorer items are selected by being clicked on once. Selected is the standard Windows blue highlight for listviews. Nothing else happens as a result of this action in the Multi Stack window or elsewhere in the Visual Studio® IDE; this state has no special meaning in the context of Multi Stack. However, selecting is useful for copying the stack frame details, and it also assists in keyboard navigation. Note that right clicking on a stack frame ListViewItem also selects it and subsequently brings up the ContextMenu (described elsewhere in this document). Selected stack frames have a little floating triangle at the end so when the user hovers over that the ContextMenu appears.

As for selecting a Stack Frame to focus on (a.k.a. double click), in some embodiments, to select a stack frame 140 to focus on the user double clicks on the frame. If the frame is only relevant to one Thread/Task, then it is set as the current frame in the IDE (SetCurrentFrame) so the code editor, watch, threads, tasks windows and so on each get updated accordingly. If the frame is shared by more than one Thread/Task, then the user has a further selection to make as to which Task they are interested in for that frame; this selection is made via the ContextMenu which is automatically displayed because the user double clicked.

As for indicating the Current Stack Frame, the current stack frame is the stack frame that the user has selected in some embodiments by double clicking or via the ContextMenu or via double clicking on a frame in the existing Call Stack window. There can only be one current stack frame at any given moment in time, although it can appear at multiple locations in the Multi Stack window, showing the same method name in each location. In some embodiments, the current stack frame has as an indication 226 a curved green arrow in front of it, like the Call Stack window uses and also the same that appears in the margin of the code editor for the current frame. In addition, the current stack frame has a bold green font and so does every other occurrence of the same method in the Multi Stack window. When the debugger breaks execution of a program 126, the current stack frame is the same as the active stack frame of the current Thread/Task. The Multi Stack window shows that if the corresponding stack is displayed in the window.

As for indicating the Active Stack Frames, in some embodiments, Active Stack frames are the top of stack of each Thread/Task. There are as many active frames as there are Threads/Tasks. The active frame is known when the user breaks in the debugger (breakpoint, exception, etc.) and does not change until execution of the program continues. Active Stack Frames can be selected just like any other frame 140. Active Stack frames can be made current, just like any other frame 140. In this case, the previous description of the Current Stack Frame also applies to the active stack. All active stack frames (irrespective of whether they are also current or selected) are indicated 224 on the Multi Stack window with an icon, namely: a yellow arrow in front of the active frame of the current Thread/Task; a new "cloth threads" icon of Orcas for the active frames of the non-current Threads/Tasks. The indication also shows the + sign if there are more than one thread.

As for details 228 of a stack frame in the list, in some embodiments the content of the call stack frame shows the type name followed by the method name. For Generics/Templates the template arguments are reduced to a open/closed empty chevron pair, e.g., "Namespace.Type.Method< >". However, method matching is done on fully qualified method signatures, not just what is on display. This formatting is not configurable for the Multi Stack window.

In some embodiments, a tooltip for an individual stack frame shows the Thread/Task Id followed by a colon followed by a more detailed view of the stack frame. The more detailed view is configured by the Call Stack ContextMenu and may include details 228 such as module names, parameter names, parameter types, parameter values, line numbers and byte offsets. For each associated Thread/Task, there is a separate line in the tooltip. One of the lines is bold to indicate the current Thread's stack frame, if there is a current thread in the call stack segment box under examination. If the stack frame is also the one that is current, then it is indicated in the tooltip with the green arrow with curved tail.

With respect to the Context Menu, in some embodiments there is only one ContextMenu, regardless of which stack frame one right clicks on in the Multi Stack window. There is no ContextMenu for right clicking on white space. Right clicking on a stack frame also selects the stack frame. If the user dismisses the ContextMenu, the only effect on the diagram is that the selected stack frame changes.

In some embodiments, the top menu item of the ContextMenu is a menu with child Switch To. Each submenuitem corresponds to a Thread/Task that shares this stack frame. The user can select one the submenuitems to set the current frame. Note that if the Switch To menu is expanded for a stack frame that is already current, one of the submenuitems corresponding to Threads/Tasks has a checkmark indicating that this is the current Thread/Task so the user can have some assistance in choosing an alternative, which is likely their intent. The submenu portion will scroll when there are too many Threads/Tasks to fit in the window. Double clicking brings up the ContextMenu when multiple Thread(s)/Task(s) are associated with the selected stack frame, and also expands the Switch To menu.

In some embodiments, the second MenuItem of the ContextMenu is a checkbox Method View, which by default is unchecked. This menu item provides a method-centered view 216.

In some embodiments, other ContextMenu items conform with the Call Stack, and their behaviour is identical, namely, Copy, Select All, Go To Source Code, Go To Disassembly, Hexadecimal Display, Show External Code. No changes are made in the functionality of these menu items; they are ported and displayed for convenience. Note that the Multi Stack ContextMenu does not include the following menu items: Include Calls To/From Other Threads, Show Module Names, Show Parameter Types, Show Parameter Names, Show Parameter Values, Show Line Numbers, Show Byte Offsets. The Multi Stack ContextMenu also supports setting 730 breakpoints 732 from the ContextMenu just like the Call Stack window does. For the Multi Stack window, a stack frame may be shared by multiple Threads/Tasks, hence there is a possibility that multiple breakpoints would be set by this single user action.

In some embodiments, requesting the Method View creates a method-centered view by pivoting the diagram on the current stack frame, to show all callers and callees associated with that frame. The view introduces a single call segment box at the center of the diagram with a single stack frame inside it, namely, the current stack frame.

In some embodiments, mechanisms and operations are provided to help users cope with large diagrams/graphs. For example, when the user resizes the Multi Stack window or the call stack segments get large enough that they need more space than the window can afford, scrollbars appear for the window. Call stack segments themselves never get scrollbars automatically. When scrollbars appear in the Multi Stack window, a square control appears between the two scrollbars, where they meet in the bottom corner of the window. When the user hovers over the control, a Bird's Eye View pane appears that the user can use to pan around. In some embodiments, Call Stack segment boxes cannot be resized. Vertically the call stack segment is as high as required to show the entire call stack segment. Horizontally, the call stack segment box autosizes to fit the longest stack frame in the segment. However, it has a max size (implementation-dependent) and when that max is reached, ellipses are shown for individual call stack segments that reach that length. The ability to zoom in and out of the diagram is available regardless of whether scrollbars are present. This correctly implies that the user can make things larger than normal as well as smaller than normal, within the range of 10% to 200%, for example. The zoom controls are exactly like the one in a Microsoft Windows Photo Gallery application introduced with the Microsoft Windows Vista® operating system. The control appears at the bottom left corner. When clicked it displays the slider and after zooming in or out, the second control allows fitting the diagram to the window.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIG. 7 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A process for visually representing in a stack prefix view at least a portion of call stack data of multiple call stacks in a parallel programming system, the process comprising the steps of:
   constructing in a memory, through execution by at least one processor of instructions which search a set of nodes for nodes that represent similar stack frames, a stack prefix graph based on call stack data of multiple call stacks, the call stack data comprising stack frames having an order based on calling sequence, each stack frame located at a respective depth within a call stack, the stack prefix graph having nodes which represent stack segments and arcs which represent adjacency of stack segments, at least one of the stack segments including a plurality of stack frames which are similar to one another, two stack frames being deemed similar when each of the stack frames represents execution of code in the same method body, as opposed to different stack frames representing execution in different respective method bodies; and
   displaying on a screen a visual representation of the stack prefix graph.

2. The process of claim 1, wherein the stack prefix graph comprises a plurality of nodes representing respective segments each of which includes a plurality of stack frames that are similar to one another.

3. The process of claim 1, wherein the process provides a stack prefix view of call stack data of at least three call stacks in a parallel programming system.

4. The process of claim 1, wherein the graph is constructed at least in part with the following steps:
   initializing a set of nodes to be empty;
   for each stack S in a set of stacks, doing the following:
      searching the set of nodes for a match, namely, a node which represents at least one stack frame similar to stack frame(s) at a specified depth in stack S,
      if no match is found, then adding to the set of nodes a new node C representing the current stack S;
      otherwise examining each frame F of the current stack S and doing at least one of the following:
         adding S to a set of stacks represented by node C if F is similar to a frame represented by node C,
         adding S to a set of stacks represented by a successor node of node C if F is similar to a frame represented by that successor node, or
         adding S to a set of stacks represented by a newly created node.

5. The process of claim 1, wherein the process also provides a method-centered view, namely, a view having at least one arc between a node representing stack frame(s) of a selected method and at least one node representing adjacent stack frame(s).

6. The process of claim 5, wherein a method-centered view graph is constructed at least in part by including in the graph a node N for each unique stack segment that leads to an invocation of the selected method as well as an arc directed from that node N to the node representing stack frame(s) of the selected method.

7. The process of claim 1, further comprising obtaining the call stack data of multiple call stacks based on at least one of the following:
   a command to show call stacks from all tasks,
   a command to show call stacks from all threads,
   a command to show call stacks of tasks or threads which have been flagged by a user.

8. The process of claim 1, further comprising displaying in response to user GUI input at least one of the following:
   details of a stack frame,
   details of a thread,
   details of a task.

9. The process of claim 1, further comprising displaying in a user GUI at least one of the following:
   an indication distinguishing an active stack frame of a current thread,
   an indication distinguishing an active stack frame of a current task,
   an indication distinguishing an active stack frame of a non-current thread,
   an indication distinguishing an active stack frame of a non-current task,
   an indication distinguishing a current thread,
   an indication distinguishing a current task.

10. A computer-readable memory configured with data and instructions for performing a process for visually representing call stack data of multiple call stacks, the computer-readable memory being a particular article of manufacture which is not a mere signal, the process comprising at least one processor executing instructions to perform the steps of:
   receiving a selection of a set of call stacks;
   initializing a set of graph nodes to be empty;
   doing the following for each stack S in the set of stacks:
      searching the set of nodes for a match, namely, a node which represents at least one stack frame similar to stack frame(s) at a specified depth in stack S, stack frames being deemed similar when each of the stack frames represents execution of code in a method body X as opposed to representing execution of code in different respective method bodies;
      if no match is found, then adding to the set of nodes a new node C representing the current stack S;
      otherwise examining each frame F of the current stack S and doing at least one of the following:
         adding S to a set of stacks represented by node C if F is similar to a frame represented by node C,
         adding S to a set of stacks represented by a successor node of node C if F is similar to a frame represented by that successor node, or
         adding S to a set of stacks represented by a newly created node; and
   outputting a visual representation of the graph nodes, at least two of the graph nodes each representing a respective stack segment which includes a plurality of similar stack frames.

11. The configured memory of claim 10, wherein the call stacks each have a top-of-stack location and a bottom-of-stack location, and the process further comprises receiving through a user GUI at least one of the following:
   a command to display the graph nodes with top-of-stack locations represented on the display above bottom-of-stack locations, a command to display the graph nodes with top-of-stack locations represented on the display below bottom-of-stack locations.

12. The configured memory of claim 10, wherein the selection of call stacks is based on receiving at least one of the following:
 a command to show call stacks from all tasks,
 a command to show call stacks from all threads,
 a command to show call stacks of tasks or threads which have been flagged by a user.

13. The configured memory of claim 10, wherein the process further comprises receiving through a user GUI a selection of a non-current frame to become a newly current frame, and then updating a debugger window based on the newly current frame.

14. The configured memory of claim 10, wherein the process further comprises receiving through a user GUI at least one of the following:
 a command to zoom in on a particular area of the visual representation of the graph nodes,
 a command to zoom out to a view displaying the entire visual representation of the graph nodes,
 a command to drag-pan across the visual representation of the graph nodes,
 a command to set a breakpoint.

15. A computer system comprising:
 a logical processor;
 a debugger configuring memory in operable communication with the logical processor; and
 a stack segments graph configuring memory in operable communication with the debugger, the stack segments graph based on call stack data of multiple call stacks, the call stack data comprising stack frames having an order based on calling sequence, each stack frame located at a respective depth within a call stack, the stack segments graph having nodes which represent stack segments and arcs which represent adjacency of stack segments, at least one of the stack segments including a plurality of similar stack frames, two stack frames being deemed similar when each of the stack frames represents execution of code in a method body X as opposed to representing execution of code in different respective method bodies.

16. The system of claim 15, wherein the system further comprises a display screen which is in operable communication with the debugger and which is configured by a coalesced stacks view that is based at least in part on the stack segments graph.

17. The system of claim 15, wherein the system further comprises a display screen which is in operable communication with the debugger and which is configured by a stack prefix view that is based at least in part on the stack segments graph, namely, a view having at least one arc directed from a node representing certain stack frame(s) to at least one node representing subsequently executed stack frame(s).

18. The system of claim 15, wherein the system further comprises a display screen which is in operable communication with the debugger and which is configured by a method-centered view that is based at least in part on the stack segments graph.

19. The system of claim 15, further comprising a display screen which is in operable communication with the debugger and which is configured by at least one of the following:
 details of a stack frame,
 details of a thread,
 details of a task.

20. The system of claim 15, further comprising a display screen which is in operable communication with the debugger and which is configured by at least one of the following:
 an indication distinguishing an active stack frame of a current thread,
 an indication distinguishing an active stack frame of a current task,
 an indication distinguishing an active stack frame of a non-current thread,
 an indication distinguishing an active stack frame of a non-current task,
 an indication distinguishing a current thread,
 an indication distinguishing a current task.

* * * * *